(12) United States Patent
Tao et al.

(10) Patent No.: US 6,304,294 B1
(45) Date of Patent: Oct. 16, 2001

(54) APPARATUS FOR AND METHOD OF ESTIMATING THE ILLUMINATION OF AN IMAGE

(75) Inventors: Bo Tao, Sunnyvale; Ingeborg Tastl, San Jose, both of CA (US)

(73) Assignees: Sony Corporation, Tokyo (JP); Sony Electronics INC, Park Ridge, NJ (US)

( * ) Notice: Subject to any disclaimer, the term of this patent is extended or adjusted under 35 U.S.C. 154(b) by 0 days.

(21) Appl. No.: 09/418,701

(22) Filed: Oct. 15, 1999

(51) Int. Cl.[7] ............................... H04N 5/222; G06K 9/00
(52) U.S. Cl. ............................................ 348/370; 382/162
(58) Field of Search ..................................... 348/362, 369, 348/370, 371; 396/157, 159; 356/213, 229; 382/162

(56) References Cited

U.S. PATENT DOCUMENTS

| | | | |
|---|---|---|---|
| 4,648,051 | * | 3/1987 | Wandell et al. ....................... 382/162 |
| 4,685,071 | | 8/1987 | Lee ........................................ 364/526 |

(List continued on next page.)

OTHER PUBLICATIONS

Jian Ho, Brian V. Funt, and Mark S. Drew, "Separating a Color Signal into Illumination and surface Reflectance Components: Theory and Applications," IEEE Transactions on Pattern Analysis and Machine Intelligence. vol. 12. No. 10., pp. 966–977, Oct. 1990.*

(List continued on next page.)

*Primary Examiner*—Wendy R. Garber
*Assistant Examiner*—Luong Nguyen
(74) *Attorney, Agent, or Firm*—Ronald C. Card; Harold T. Fujii

(57) ABSTRACT

The apparatus for and method of estimating the illumination closely approximates an illumination of a corresponding image. This apparatus for and method of estimating the illumination utilizes appropriate linear models to represent the illumination spectral power distribution of the illumination and the spectral surface reflectance. The linear model of the illumination spectral power distribution, $L(n)$, is represented by:

$$L(n) = \sum_{m=1}^{D_1} \alpha_m B_m(n)$$

The linear model of the spectral reflectance function, $R(n)$, is represented by:

$$R_k(n) = \sum_{m=1}^{D_2} \beta_{k,m} C_m(n)$$

By utilizing these linear models, the illumination of the image is capable of being closely approximated by the following equation and corresponding constraint:

$$\min_{\alpha_m, \beta_{k,m}} \sum_k \sum_j \left\| f_{k,j} - \left[ \sum_n S_j(n) \times \left( \sum_m \alpha_m B_m(n) \right) \times \left( \sum_m \beta_{k,m} C_m(n) \right) \right] \right\|$$

$$L(n) \geq 0 \text{ and } 0 \leq R_k(n) \leq 1$$

By applying standard minimization techniques to the above equation and corresponding constraint, the unknown spectral power distribution weighting coefficients ($\alpha_m$) and spectral reflectance weighting coefficients ($\beta_{k,m}$) are estimated. These estimated spectral power distribution weighting coefficients ($\alpha_m$) and spectral reflectance weighting coefficients ($\beta_{k,m}$) calculated by the above equation and corresponding constraint are not exact solutions but are approximations. By utilizing the approximations of $\alpha_m$ and $\beta_{k,m}$, the illumination level corresponding to the image is also a carefully estimated approximation and obviates the need for an exact solution for the illumination level. By overcoming the need to find an exact solution for the illumination level of the scene, the estimated approximation has a wider degree of freedom than an exact solution and is capable of being closer to the real illumination level.

8 Claims, 1 Drawing Sheet

U.S. PATENT DOCUMENTS

| | | | |
|---|---|---|---|
| 4,992,963 | * | 2/1991 | Funt et al. .......................... 382/162 |
| 5,636,143 | * | 6/1997 | Takahashi ............................. 355/30 |
| 5,907,629 |   | 5/1999 | Funt et al. .......................... 382/162 |
| 6,038,339 | * | 3/2000 | Hubel et al. ........................ 382/162 |

OTHER PUBLICATIONS

G.D. Finlayson, B. V. Funt and K. Barnard, "Color Constancy Under Varying Illumination," 0–8186–7042–8/95 $4.00 ©to Aug. 1995 IEEE, pp. 720–725.*

Brian Funt, Vlad Cardei and Kobus Barnard, "Learning Color Constancy," School of Computing Science, Simon Fraser University, Vancouver, Canada, The Fourth Color Imaging Conference: Color Science, Systems and Applications, pp. 58–60.

"Probabilistic Color Constancy"; This document is drawn from a book chapter by D'Zmura, Iverson & Singer (1995, in press), pp. 1–14.

Gaurav Sharma, H. Joel Trussell, "Set theoretic estimation in color scanner characterization," Journal of Electronic Imaging 5(4), 479–489 (Oct. 1996).

Laurence T. Maloney and Brian A. Wandell, "Color constancy: a method for recovering surface spectral reflectance," vol. 3, No. 1/Jan. 1986/J. Opt. Soc. Am. A, pp. 29–33.

H. Joel Trussell and Michael J. Vrhel, "Estimation of Illumination for Color Correction," CH2977–7/91/0000–2513 $1.00© 1991 IEEE, pp. 2513–2516.

Jian Ho, Brian V. Funt and Mark S. Drew, "Separating a Color Signal into Illumination and Surface Reflectance Components: Theory and Applications," IEEE Transactions on Pattern Analysis and Machine Intelligence, vol. 12, No. 10., pp. 966–977, Oct. 1990.

Daniel J. Jobson, Member, IEEE, Zia–ur Rahman, Member, IEEE, and Glenn A. Woodell, "A Multiscale Retinex for Bridging the Gap Between Color Images and the Human Observation of Scenes," IEEE Transactions on Image Processing, vol. 6. No. 7., pp. 965–976, Jul. 1997.

W. T. Freeman and D. H. Brainard, "Bayesian Decision Theory, the Maximum Local Mass Estimate, and Color Constancy," 0–8186–7042–8/95 $4.00© 1995 IEEE, pp. 210–217.

Graham D. Finlayson, Paul M. Hubel and Steven Hordley, "Color by Correlation," The Fifth Color Imaging Conference: Color Science, Systems, and Applications, pp. 6–11.

* cited by examiner

APPARATUS FOR AND METHOD OF ESTIMATING THE ILLUMINATION OF AN IMAGE

FIELD OF THE INVENTION

The present invention relates to the field of digital imaging. More particularly, the present invention relates to the field of illumination estimation of digital images.

BACKGROUND OF THE INVENTION

A perceived color of an object is determined by three main factors: the physical properties of the object, the actual illumination of the object by an illumination source, and the sensitivity of the input device. Changing any one of these three factors may possibly change the perceived color of the object. For example, assuming that the input device is a digital camera, the illumination source is natural sunlight, and a white piece of paper is the viewed object, the digital camera will perceive this piece of paper as being white in color. However, if the illumination source is changed from natural sunlight to fluorescent lighting and no other transformations on the raw data are performed, the digital camera will perceive the color of the object as off-white; this piece of paper will be perceived by the camera as being different colors when illuminated by different types of illumination sources.

In contrast to the digital camera, a human observer perceives this white piece of paper as being white whether the natural sunlight or the fluorescent lighting serves as the illumination source. Within certain limits, the human eye compensates for the varying types of illumination sources and perceives an object illuminated by different types of illumination sources as having the same color.

In general, white balancing algorithms aid digital cameras in reproducing color images which more closely mimic the perception of the human eye. In this prior example, white balancing algorithms are utilized in digital cameras to allow the resultant digital image of an object to be perceived as the same color whether illuminated by fluorescent lighting or natural sunlight. White balancing algorithms emphasize color reproduction which is realistic to the human eye. Typically, the first step in a white balancing algorithm is to estimate the scene illumination from the digital image.

There are a variety of different techniques for estimating a scene illumination from an image. These techniques include gray-world algorithm, estimation based on specular reflectance, neural network, statistical approaches, extra sensing devices, and reflectance in two-dimensional space. The gray-world algorithm assumes that the spatial average of surface reflectance within the scene is achromatic. Accordingly, the gray-world algorithm assumes that the average pixel value of a digital image of a scene corresponds to the color of the illumination. Often times this assumption is not true and, as a result, the gray-world algorithm fails. The estimation based on specular reflectance technique is similar to the gray-world algorithm, because this estimation based on reflectance relies on a certain percentage of light reflected in a specular manner. If there are not enough highlights, the estimation based on specular reflectance fails to accurately estimate scene illumination for white balancing.

The neural network technique and the statistical approach require considerable training to accurately estimate the illumination. As the neural network and the statistical approach gain experience by more training, they are able to increase their accuracy of illumination estimation. However, providing this training is expensive during both development and implementation of the neural network and the statistical approach. Even with this extensive training, the illumination of certain images may not be approximated accurately enough by neither the neural network technique nor the statistical approach.

As a way to increase accuracy of illumination estimation, extra sensing devices are sometimes utilized to gather additional information otherwise not captured with a single sensor. However, these extra sensor devices add additional manufacturing costs and mechanical complexity to the camera device.

Additional methods of estimating the illumination of the image are based on linear decomposition of the surface reflectance and the spectral power distribution of the illumination. Under the assumption that the surface reflectance lies in a two-dimensional space, and the illumination lies in a three-dimensional space, on exact solution for the illumination can be calculated from a three channel image. However, utilizing a two-dimensional space for the reflectance does not ensure that the exact solution for the illumination is necessarily the correct solution. For example, the an exact representation of the actual surface reflectance can be outside the boundary of a two-dimensional space. Accordingly, when the correct surface reflectance level cannot be accurately represented in this two-dimensional space, this method will not provide an optimal estimation of the illumination of the scene.

SUMMARY OF THE INVENTION

The apparatus for and method of estimating the illumination closely approximates an illumination level of a corresponding image. This apparatus for and method of estimating the illumination utilizes appropriate linear models to represent the illumination spectral power distribution of the illumination and the spectral surface reflectances. The linear model of the illumination spectral power distribution of the illumination, L(n), is represented by:

$$L(n) = \sum_{m=1}^{D_1} \alpha_m B_m(n)$$

The linear model of the surface reflectance function, R(n), is represented by:

$$R_k(n) = \sum_{m=1}^{D_2} \beta_{k,m} C_m(n)$$

By utilizing these linear models, the illumination of the image is capable of being closely approximated by the following equation and corresponding constraint:

$$\min_{\alpha_m, \beta_{k,m}} \sum_k \sum_j \left\| f_{k,j} - \left[ \sum_n S_j(n) \times \left( \sum_m \alpha_m B_m(n) \right) \times \left( \sum_m \beta_{k,m} C_m(n) \right) \right] \right\| \bigg| L(n) \geq 0 \text{ and } 0 \leq R_k(n) \leq 1$$

the color value at one position in the image. By applying standard minimization techniques to the above equation and corresponding constraint, the unknown spectral illumination weighting coefficients ($\alpha_m$) and reflectance weighting coefficients ($\beta_{k,m}$) are estimated. These estimated illumination weighting coefficients ($\alpha_m$) and reflectance coefficients ($\beta_{k,m}$) calculated by the above equation and corresponding constraint are not exact solutions but are approximations. By utilizing the approximations of $\alpha_m$ and $\beta_{k,m}$, the illumination corresponding to the image is also a carefully estimated approximation and obviates the need for an exact solution for the illumination level. By overcoming the constraints, necessary for calculating an exact solution for the illumination level of the scene, the estimated illumination has a wider degree of freedom than an exact solution and is capable of being closer to the real illumination.

DETAILED DESCRIPTION OF THE INVENTION

This invention related to digital still and video cameras. In both the still and video cameras, white balancing is performed to discount the illumination factor when producing the image so that the color of the image is close to the actual color perceived by a person.

Figure 1:
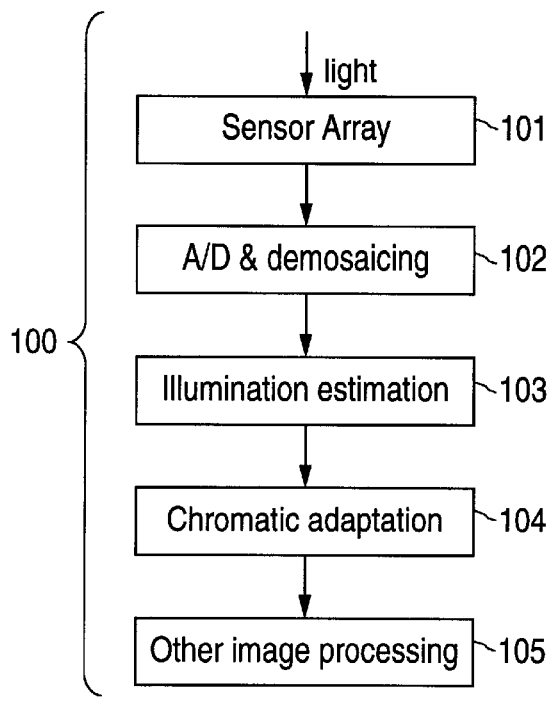
FIG. 1 illustrates a block diagram showing portions of the digital camera related to white balancing.

FIG. 1 shows a simplified digital camera 100 which utilizes blocks to represent basic functional elements The digital camera 100 includes a sensor array 101, an analog to digital (A/D) converter with demosaicing 102, an illumination estimation device 103, a chromatic adaptation device 104, and other image processing devices 105. The sensor array 101 preferably detects light from a source outside the digital camera 100. The sensor array 101 is preferably configured to transmit this information to the A/D converter and demosaicing 102. Within the A/D converter and demosaicing 102, the analog light information from the sensor array 101 is converted to digital data and the resultant digital data is demosaiced. The digital data is then transmitted to the illumination estimation device 103 where the scene illumination of the digital data is estimated. Based on the scene illumination provided by the illumination estimation device 103, the chromatic adaptation device 104 appropriately adjusts the image. The white balancing portion of the camera consists of the illumination estimation device 103 and the chromatic adaptation device 104.

A critical step in the white balancing function is to estimate the scene illumination. Each color spectrum within this scene is sampled at a discrete number of wavelengths n (i.e. n=1, 2, 3, ..., N), wherein N represents the total number of wavelengths. The vector L (n) represents the spectral power distribution of the illumination $R_k(n)$ represents the surface reflectance at pixel k (i.e. k=1, 2, 3, ..., K), wherein K represents the total number of pixels within this sampled scene. $S_j(n)$, represents the sensor sensitivity of sensor type j (i.e. j=1, 2, 3, ..., J), wherein J represents the total number of sensor types within the digital camera.

As an example, an image is represented by 512 vertical pixels by 512 horizontal pixels, thus resulting in 262,144 total pixels which is equal to K. Further in this example, there are three sensors for an RGB camera, thus J is equal to three. The above values assigned to J and K are only sample values for exemplary purposes. It would be within the scope of the present invention to utilize different values for J and K. The color value at pixel k perceived by sensor j is represented by the function, $f_{k,j}(n)$, as shown by equation #1 below.

$$f_{k,j} = \sum_{n=1}^{N} L(n) \times R_k(n) \times S_j(n) \qquad \text{Eqn. 1}$$

The corresponding color value of each pixel as represented in the function $f_{k,j}(n)$ is obtained from the A/D converter 102 in FIG. 1.

The present invention is capable of estimating the color of the illumination, a three-dimensional vector which is represented by the vector L, as shown by the equation #2 below.

$$L_j = \sum_{n=1}^{N} L(n) \times S_j(n) \qquad \text{Eqn. 2}$$

In the optimal case the spectral power distribution of the illumination L(n) is estimated. Furthermore, spectral reflectance (as represented by the function R(n)) by utilizing appropriate linear models, respectively. Specifically, the linear model of the spectral power distribution (vector L) is represented by equation #3 shown below.

$$L(n) = \sum_{m=1}^{D_1} \alpha_m B_m(n) \qquad \text{Eqn. 3}$$

The $B_m$ (n) basis functions represent a set of basis functions for modeling the spectral power distribution of illuminations. A corresponding $\alpha_m$ value preferably represents a weighting coefficient which appropriately scales the $B_m$ (n) basis function such that the resultant values for equation #3 represent the spectral power distribution of the actual illumination. The above equation #3 allows the spectral power distribution of the illumination to be characterized by the illumination weighting coefficients ($\alpha$) as shown below in equation #4.

$$\alpha = \alpha_1, \alpha_2, \alpha_3, \ldots \alpha_{D1} \qquad \text{Eqn. 4}$$

Further, the linear model of the spectral reflectance function, R(n), is represented by equation #5 shown below.

$$R_k(n) = \sum_{m=1}^{D_2} \beta_{k,m} C_m(n) \qquad \text{Eqn. 5}$$

The $C_m$ (n) basis functions represent a set of basis functions for modeling the spectral reflectance function. A corresponding $\beta_{k,m}$ value preferably represents a weighting coefficient which appropriately scales each $C_m$ (n) basis function such that the resultant values for equation #5 represent the spectral reflectance function. The above equation #5 allows the spectral reflectance to be characterized by the spectral reflectance weighting coefficients ($\beta$) as shown below in equation #6.

$$\beta = \beta_{k,1}, \beta_{k,2}, \beta_{k,3}, \ldots \beta_{k,D2} \qquad \text{Eqn. 6}$$

Using 2 basis functions for the reflectance and 3 basis functions for the illumination, it is possible to calculate an exact solution from a 3 channel image. However, these constraints do not correspond well with real world situations.

By substituting the function L(n) as shown above in equation #3 for L(n) in equation #2, the resultant combination is shown below in equation #7.

$$L_j = \sum_{m=1}^{D_1} \alpha_m \sum_{n=1}^{N} B_m(n) \times S_j(n) \qquad \text{Eqn. 7}$$

From equation #7, the basis function $B_m(n)$ and the sensor sensitivity function $S_j(n)$ can be treated as a constant. Accordingly, equation #8, as shown below, is derived by simplifying the constants $B_m(n)$ and $S_j(n)$ in equation #7 by creating constant $K_{mj}$.

$$L_j = \sum_{m=1}^{D_1} \alpha_m \times K_{m,j} \qquad \text{Eqn. 8}$$

As shown in Equation #8, $K_{mj}$ is treated as a constant. Accordingly, only the $\alpha_m$ value is needed to produce $L_m$, which furthermore can be used in equation 3 to calculate the spectral power distribution L.

The illumination coefficients and the surface coefficients can be calculated by using a constrained minimization (equation 9). Additionally, the reflectance at each pixel as represented by R(k) is constrained between the values of 0 and 1. By utilizing equation #1 with the mentioned constraints and utilizing the weighting coefficients of the illumination and spectral reflectance as shown in equations #4 and #6, equation #9 as shown below is created.

$$\min_{\alpha_m, \beta_{k,m}} \sum_k \sum_j \qquad \text{Eqn. 9}$$

$$\left\| f_{k,j} - \left[ \sum_n S_j(n) \times \left( \sum_m \alpha_m B_m(n) \right) \times \left( \sum_m \beta_{k,m} C_m(n) \right) \right] \right\|$$

$$L(n) \geq 0 \text{ and } 0 \leq R_k(n) \leq 1$$

Equation #9 illustrates the technique as taught by the present invention for determining the illumination. Standard optimization techniques can be utilized to solve for the variables ($\alpha_m$, $\beta_{k,m}$) in Equation #9. In the present invention, the steepest descent algorithm is utilized as the minimization technique in the present invention. Although the steepest descent algorithm is utilized in the present invention, a variety of other minimization techniques can be utilized. By utilizing a minimization technique on equation #9, both the spectral power distribution weighting coefficients ($\alpha_m$) and the spectral reflectance weighting coefficients ($\beta_{k,m}$) can be calculated. From the spectral power distribution weighting coefficients ($\alpha_m$) and the spectral reflectance weighting coefficients ($\beta_{k,m}$), a close approximation of the illumination of the scene can be produced. Because Equation #9 is configured to allow multiple basis functions with multiple corresponding weighting coefficients ($\alpha_m$ and $\beta_{k,m}$), there is a large degree of freedom in approximating the weighting coefficients ($\alpha_m$ and $\beta_{k,m}$) which also leads to more accurate approximations. The present invention is capable of accurately estimating the illumination of a scene.

Figure 2:
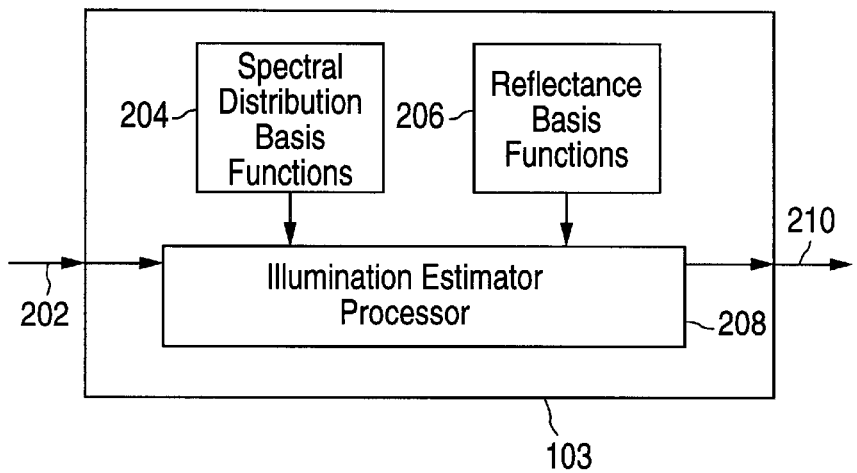
FIG. 2 illustrates a block diagram showing the illumination estimation apparatus according to the present invention.

FIG. 2 illustrates a more detailed diagram of the illumination estimation device 103. The illumination estimation device 103 includes an illumination estimator processor 208, storage device for the basis functions of the illuminations 204, and a storage device for the basis functions of the reflectances 206.

In operation, digital data representing a scene from the A/D converter 102 (FIG. 1) is preferably passed to the illumination estimation device 103 and enters the illumination estimator processor 208, as shown by a data path 202. The illumination estimator processor 208 preferably utilizes the basis functions from the illumination basis functions storage device 204 and the surface reflectance basis functions storage device 206 to calculate an illumination estimation of the scene. By solving for both the spectral power distribution weighting coefficients ($\alpha_m$) and the spectral reflectance weighting coefficients ($\beta_{k,m}$), the illumination estimator process 208 preferably returns the illumination estimation of the scene along with the digital data representing this scene out of the illumination estimation device 103 as shown by a data path 210.

Figure 3:
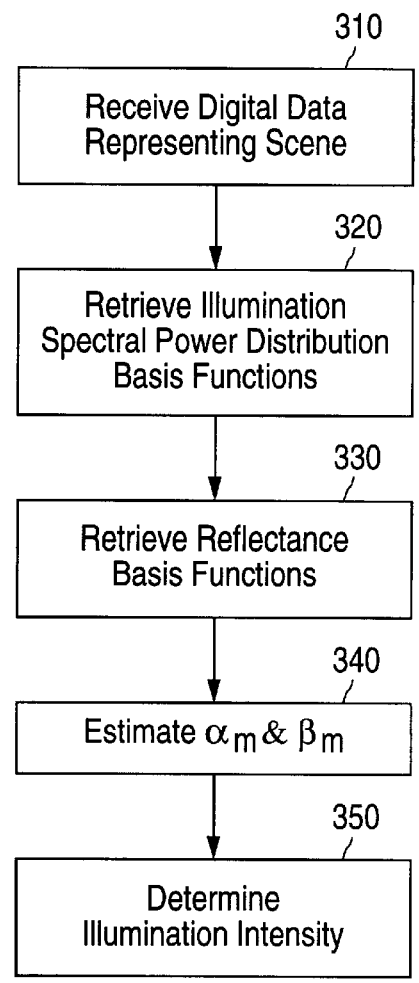
FIG. 3 illustrates a simplified flow chart showing the method of illumination estimation according to the present invention.

FIG. 3 illustrates a simplified flow chart showing exemplary steps when the illumination estimator device 103 (FIG. 1) estimates the illumination of a given scene. The illumination estimator device 103 preferably begins at task 310 where the digital data representing a scene is received by the estimator device 103. At task 320, a set of appropriate basis functions relating to the spectral power distribution of the illumination are retrieved. At task 330, a set of appropriate basis functions relating to the spectral reflectance are retrieved. Next at task 340, appropriate weighting coefficients for the spectral power distribution of the illumination ($\alpha_m$) and appropriate weighting coefficients for the spectral reflectance ($\beta_{k,m}$) are preferably estimated utilizing the optimization expressed in equation #9 and the corresponding constraint. Finally, at task 350, the illumination estimator device 103 utilizes the weighting coefficients for the spectral power distribution ($\alpha_m$) and for the spectral reflectance ($\beta_{k,m}$) as estimated from the task 340 and provides an illumination estimation for the scene.

In one embodiment, the coefficients $\alpha_m$ and $\beta_{k,m}$ can be bounded to further constrain the solution space. Similarly, in one embodiment, several different basis functions sets can be utilized with each giving a different optimization results. A combination of these different optimization results can be used as the illumination estimation.

In one embodiment, linear transformations with a 3×3 matrix can be applied to the color value of the representative light signal prior to being received by the illumination estimation device 103 (FIG. 1). By utilizing a properly-chosen transformation and/or multiple transformations, the illumination estimation device 103 will provide an improved illumination estimation.

A further variation is to use iterative estimation. That is, at each step, the illumination estimation is first fixed, and then the reflectance for each pixel is computed. Next, the reflectance is fixed, and the illumination is then computed. This process is iterated until a predetermined convergence is achieved or a maximum number of steps has been performed. The advantage of this variation is that the reflectance estimation step can be performed in parallel which allows all the pixels to be simultaneously computed.

When this iterative approach is utilized, each time this approach is executed, the following problem $\min_x \|Y-AX\|$ such that $HX \leq 0$ is solved in an abstract form. For example, when the illumination is estimated with a fixed reflectance estimation, X represents the set of weighting coefficients ($\alpha_m$). The non-constrained optimal solution satisfies $A'Y = A'AX^*$. Based on this realization, another variation can be made to the iterative approach to reduce the computation in estimating the coefficients ($\alpha_m$). Instead of minimizing $\|Y-AX\|$, we solve for the following problem $\min_x \|A'Y - A'AX\|$ such that $HX \leq 0$.

The present invention has been described in terms of specific embodiments incorporating details to facilitate the understanding of principles of construction and operation of the invention. Such references herein to specific embodiments and details thereof are not intended to limit the scope of the claims appended hereto. It will be apparent to those skilled in the art that modification may be made in the embodiment chosen for illustration without departing from the spirit and scope of the present invention.

In the claims, we claim:

1. An apparatus for estimating an illumination of a scene, the apparatus comprising:
   a. a sensor device for detecting a light wave from the scene; and
   b. a processor coupled to the sensor device wherein the processor is configured to receive the illumination data from the sensor and to estimate a value for a set of weighting coefficients $\alpha_m$ and a set of weighting coefficients $\beta_{k,m}$, as defined by the relation:

$$\min_{\alpha_m, \beta_{k,m}} \sum_k \sum_j \left\| f_{k,j} - \left[ \sum_n S_j(n) \times \left( \sum_m \alpha_m B_m(n) \right) \times \left( \sum_m \beta_{k,m} C_m(n) \right) \right] \right\|$$

wherein n represents a number of wavelengths, $S_j(n)$ represents a sensor sensitivity function, $B_m(n)$ represents a basis function for modeling spectral power distribution, $C_m(n)$ represents a basis function for modeling spectral reflectance, and $f_{k,j}$ represents a function of a color value of each pixel.

2. The apparatus according to claim 1 wherein the processor is further configured to utilize constraints defined by the relation:

$$L(n) \leq 0 \text{ and } 0 \geq R_k(n) \leq 1$$

wherein $$R_k(n) = \sum_{m=1}^{D_2} B_{k,m} C_m(n)$$

and $$L(n) = \sum_{m=1}^{D_1} \alpha_m B_m(n).$$

wherein n represents a number of wavelengths, $L(n)$ represents a spectral power distribution function, $B_m(n)$ represents a basis function for modeling spectral power distribution, $C_m(n)$ represents a basis function for modeling spectral reflectance, and $R_k(n)$ represents a spectral reflectance function.

3. The apparatus according to claim 1 further comprising a storage device coupled to the processor and for storing a plurality of basis functions for the reflectance.

4. The apparatus according to claim 1 further comprising a storage device coupled to the processor and for storing a plurality of basis functions for the reflectance.

5. The apparatus according to claim 1 wherein the processor further comprises means for performing a standard minimization technique to estimate the value for the set of weighting coefficients $\alpha_m$ and the set of weighting coefficients $\beta_{k,m}$.

6. The apparatus according to claim 5 wherein the means for performing the standard minimization technique is a steepest decent algorithm.

7. An apparatus for estimating an illumination of a scene, the apparatus comprising:
   a. means for detecting a light wave from the scene; and
   b. a processor coupled to the sensor device wherein the processor is configured to receive the illumination data from the sensor and to estimate a value for a set of weighting coefficients $\alpha_m$ and a set of weighting coefficients $\beta_{k,m}$, as defined by the relation:

$$\min_{\alpha_m, \beta_{k,m}} \sum_k \sum_j \left\| f_{k,j} - \left[ \sum_n S_j(n) \times \left( \sum_m \alpha_m B_m(n) \right) \times \left( \sum_m \beta_{k,m} C_m(n) \right) \right] \right\|$$

wherein the processor further comprises means for performing a standard minimization technique to estimate the value for the set of weighting coefficients $\alpha_m$ and the set of weighting coefficients $\beta_{k,m}$ and wherein n represents a number of wavelengths, $S_j(n)$ represents a sensor sensitivity function, $B_m(n)$ represents a basis function for modeling spectral power distribution, $C_m(n)$ represents a basis function for modeling spectral reflectance, and $f_{k,j}$ represents a function of a color value of each pixel.

8. The apparatus according to claim 7 wherein the processor is further configured to utilize constraints defined by the relation:

$$L(n) \geq 0 \text{ and } 0 \leq R_k(n) \leq 1$$

wherein $$R_k(n) = \sum_{m=1}^{D_2} B_{k,m} C_m(n)$$

and $$L(n) = \sum_{m=1}^{D_1} \alpha_m B_m(n)$$

wherein n represents a number of wavelengths, $L(n)$ represents a spectral power distribution function, $B_m(n)$ represents a basis function for modeling spectral power distribution, $C_m(n)$ represents a basis function for modeling spectral reflectance, and $R_k(n)$ represents a spectral reflectance function.

* * * * *